J. ROCHE & A. OLIVER.
METHOD FOR PURIFYING WATER.
APPLICATION FILED AUG. 13, 1909.

952,842.

Patented Mar. 22, 1910.

Witnesses:
Raphaël Netter
C. D. Morrill

Inventors:
John Roche
Albert Oliver
By their Attorneys
Miller & Merwin

UNITED STATES PATENT OFFICE.

JOHN ROCHE AND ALBERT OLIVER, OF NEW YORK, N. Y., ASSIGNORS TO OLIVER-ROCHE COMPANY, OF NEW YORK, N. Y., A CORPORATION OF NEW YORK.

METHOD FOR PURIFYING WATER.

952,842.  Specification of Letters Patent.  Patented Mar. 22, 1910.

Application filed August 13, 1909. Serial No. 512,748.

*To all whom it may concern:*

Be it known that we, JOHN ROCHE and ALBERT OLIVER, citizens of the United States, said ROCHE being a resident of the borough of Manhattan, city, county, and State of New York, and said OLIVER being a resident of the borough of Brooklyn, county of Kings, city and State of New York, have invented a new and useful Method for Purifying Water, of which the following is a specification.

This invention relates to improvements in processes for purifying water for potable and industrial purposes, on a large scale, and particularly for the purification of the water supply of cities, factories and manufacturing plants, the same being accomplished either with or without the introduction of a chemical coagulant according to the nature of the water to be treated.

Figure 1:
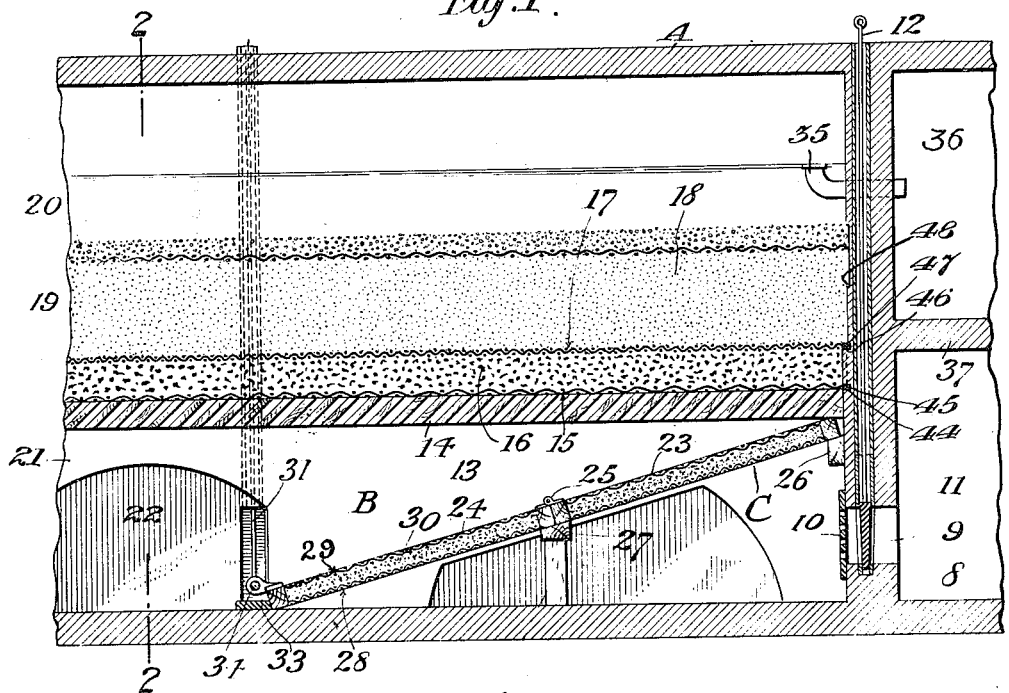
Figure 2:
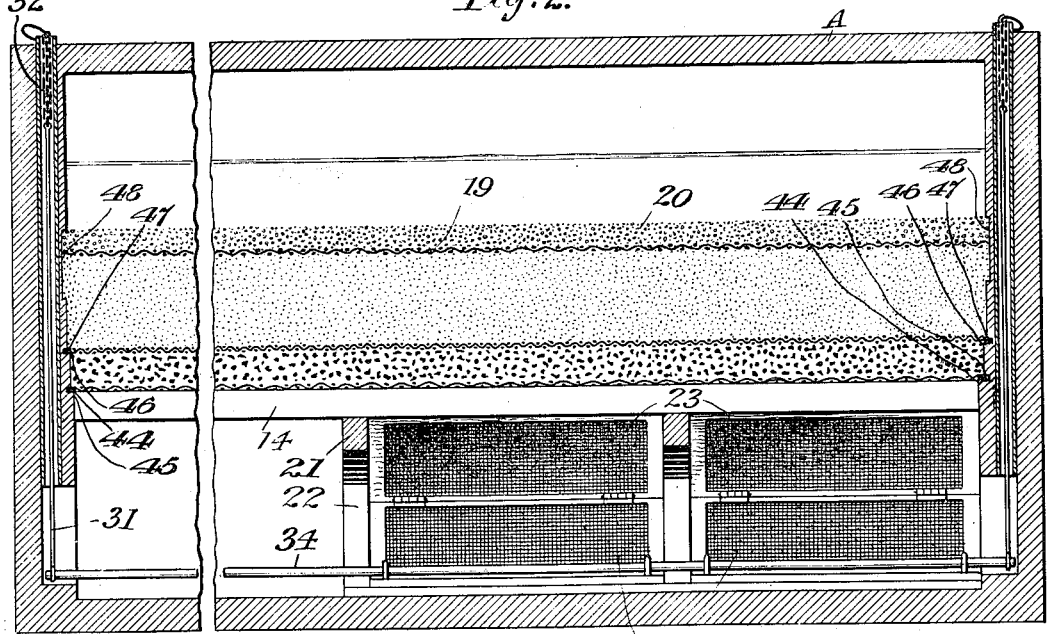

The invention is described in detail in the accompanying specification, and the drawings forming part hereof, in which, Figure 1 is a fragmentary, vertical sectional view of a unit of a filtration plant suitable for carrying out this process; and Fig. 2 is a vertical sectional detail along line 2—2 of Fig. 1.

Referring to the drawings, and the construction of the filtration plant shown therein, the reference letter A designates the filtration bed which is in communication with the conduit 8 in which water is maintained under uniform pressure. The inlet opening 9, connecting said conduit and said bed, is provided with a perforate plate 10, the size of the opening through which is adjusted to permit a flow of water under such uniform pressure equivalent to the maximum working capacity of the bed when in clean or normal condition, and a cut-off valve 11, operable in any suitable way as by means of the rod 12, serves to cut off entirely the flow of water through said inlet when it is desired to flush or clean the sedimentation basin 13. Such flushing or cleaning is accomplished by opening suitable drainage pipes (not shown), thus drawing off the impounded water below the filtration bed and inducing a reverse or downward flow of the purified water standing above said bed. This cleansing operation may be repeated if desired to insure complete cleansing of the bed, after which the drainage pipes are closed and the valve 11 is opened to permit the inflow of water, whereupon the automatic operation of the filter is resumed.

The filtration bed is preferably arranged to span the entire space between the respective walls thereof, and comprises a series of upwardly inclined, horizontally extending slabs or slats 14 upon which is supported a galvanized iron screen 15, of heavy wire of approximately $\frac{1}{4}''$ mesh, upon which in turn is positioned a layer of carbon 16, preferably animal charcoal, consisting of particles of approximately one-half inch in diameter, said layer being preferably about 7 inches in thickness. A brass or copper screen 17 of relatively fine mesh, preferably 40 mesh to the lineal inch, is superposed above said carbon layer. Upon the screen 17 is arranged a layer of fine sand 18, preferably of the size to just refuse a screen of 30 mesh, and usually about 21 inches in depth. In order to prevent the flotation of the sand, particularly the upper portion of the layer, and the consequent reduction in filtering efficiency, we provide means for loading said sand, comprising a fine mesh copper screen 19 similar to the screen 17, upon which is placed a layer 20 of gravel about 8 inches in depth, the particles of said layer being about one-half inch in diameter. By this means disruption, flotation or suspension of the sand layer, in case of accidental increase in pressure in excess of the normal working pressure on the bed, is prevented, and disruption or disturbance of the sand by the creeping of currents upward along the side walls is prevented by staggering these walls as shown in the drawings.

The several basins 13 in each of the respective filtration units are preferably subdivided by skeleton partition walls 21, having arched openings 22 therein, whereby intercommunication is afforded between the several compartments of each unit, with the exception that the wall immediately adjacent the compartment constituting a standpipe, is imperforate, in order that all of the water entering through the inlet 9 must first pass through an apron screen C which is adapted to eliminate the larger impurities in suspension. These screens are preferably constructed, as indicated in the drawings, in two sections, an upper section 23 and a lower section 24, which are preferably hinged together as indicated by the numeral 25. A cleat 26 and a girder 27 respectively serve to support said sections at their respective upper ends, the lower end of the section 24 resting upon the bottom of said sedimentation basin. These screens are preferably constructed of two layers of wire mesh, consisting of a copper mesh 28 substantially similar to the copper mesh screens of the filter beds, and a galvanized iron screen 29 substantially similar to the other galvanized iron screens employed. The intermediate space between the screen is filled with any suitable screen material, preferably particles of animal charcoal or coarse sand of approximately one-half inch in diameter. Said screens are tightly fitted intermediate the walls of two of the entering compartments so that all the water entering through the inlet 9 must pass therethrough. Obviously in those instances where the water is relatively free from large impurities in suspension, these auxiliary screens may be elevated or dispensed with. In order that the screens may be elevated when it is desired to put them out of commission during the operation of cleansing or because of the relative freeness of the entering water from matters in suspension, the lower members 24 are connected with rods 31 preferably having flexible upper ends consisting of light chains 32, which rods 31 are connected by lugs 33 with a rail 34 attached to the lower end of the section 24. The water, when purified by passage through the filtration beds is conducted off through pipes 35 and conduit 36, the latter being preferably superposed on the conduit 8, and separated therefrom by the partition 37. The pressure of water upon the filtration bed, determined by the amount of flow through the inlet opening, is preferably such as to establish a head of not less than 4" and not exceeding 24", when the bed is in a clean, normal condition, dependent upon the thickness or depth of the filtering material.

To effectively preclude the passage of water through the filtration bed without proper filtration of the same, we provide suitable steps upon the inclosing walls, whereby a stepped or staggered effect is produced. The lower step 44 supports a stringer 45, which stringer is level with the uppermost level of the inclined slats 14 and is adapted to receive the edges of the galvanized iron screen 15 the latter being secured thereto. A second step 46 supports a stringer 47 upon which the copper screen 17 is positioned, said stringer being level with the upper level of the carbon layer and a third step 48 is preferably arranged midway of the sand layer in order that a portion of the sand will project beyond the outermost limits of the sand supported by said screen 17 and thus afford additional precaution against any tendency of the water to creep or pass upwardly by capillary action, or otherwise, between the filter bed and the inclosing walls without proper filtration thereof.

The purification of the water is accomplished not only by the physical filtration in passing through the bed, but also by virtue of the fact that the elements of the filtration bed serve as an electric couple, which in conjunction with the electrolyte consisting of impure water, constitutes a primary battery. Thus it is apparent that the decomposition of the raw water, i. e. the electrolyte, will be accomplished, and a small but continuous supply of the products of electrolytic decomposition will be discharged into the water as it passes through the bed. The exact amount of these products as determined from the actual operation of the apparatus, while relatively small is sufficient to maintain the necessary biological action to accomplish the elimination of substantially all undesirable bacteria, and to maintain this action at full efficiency throughout the filtration. This biological purification is accomplished within the filter, instead of prior to the passage of the water therethrough, in contradistinction to biological purification in the scum which forms on the surface of a gravity filter. Since ordinary ground water when interposed between zinc and copper electrodes will be decomposed by .5 volt of electricity, and also since the normal difference of potential between zinc and copper separated by an electrolyte consisting of ordinary ground water is .78 volts, it is evident that the means afforded in the above described apparatus are ample for the intended purpose of producing the small amount of the products of electrolytic decomposition required for such waters.

For the highest efficiency of purification it is requisite for the water to pass in a continuous and relatively slow upward flow through the layer of carbon which has extensive superficial area and is capable of occluding substantial quantities of the nascent products resulting from the electrolysis of the water, whereby minute subdivision of the water is effected and intimate and prolonged contact with said products is secured.

Having thus described our invention what we claim is:

The process of purifying water, which consists in inducing a relatively slow and continuous flow of a body of water through a filtering medium, consisting of porous particles of extensive superficial filtering area, said filtering medium being interposed between a plurality of dissimilar metallic elements and affording a resistance to the flow of electric current therebetween in substantial excess of that of a metallic conductor, and serving to preclude the unimpeded flow of electric current between said electrodes, the said water constituting the electrolyte of a primary battery, whereby said water is subjected to intimate and prolonged contact with the nascent products resulting from the electrolytic decomposition thereof.

JOHN ROCHE.
ALBERT OLIVER.

Witnesses:
CLARENCE J. WYCKOFF,
JOHN H. PYPER.